(12) United States Patent
Martins et al.

(10) Patent No.: US 12,245,595 B2
(45) Date of Patent: Mar. 11, 2025

(54) COMPOSITION CONTAINING MICROORGANISMS FOR PROMOTING GROWTH AND REDUCING HYDRIC STRESS IN CULTIVATED PLANTS AND USE THEREOF

(71) Applicant: AGRIVALLE BRASIL INDÚSTRIA E COMÉRCIO DE PRODUTOS AGRÍCOLAS LTDA, Salto (BR)

(72) Inventors: Thales Facanali Martins, Indaiatuba (BR); Eduardo Roberto De Almeida Bernardo, Indaiatuba (BR); Bernardo Albuquerque Regina De Matto Vieira, Campinas (BR); Iron Amoreli De Figueiredo Ribeiro, Indaiatuba (BR)

(73) Assignee: AGRIVALLE BRASIL INDÚSTRIA E COMÉRCIO DE PRODUTOS AGRÍCOLAS LTDA, Salto (BR)

( * ) Notice: Subject to any disclaimer, the term of this patent is extended or adjusted under 35 U.S.C. 154(b) by 468 days.

(21) Appl. No.: 17/285,261

(22) PCT Filed: Feb. 21, 2019

(86) PCT No.: PCT/BR2019/050051
§ 371 (c)(1),
(2) Date: Apr. 14, 2021

(87) PCT Pub. No.: WO2020/124178
PCT Pub. Date: Jun. 25, 2020

(65) Prior Publication Data
US 2021/0368807 A1    Dec. 2, 2021

(30) Foreign Application Priority Data

Dec. 17, 2018  (BR) .................. 102018076265-6

(51) Int. Cl.
*A01N 63/22* (2020.01)
*A01P 21/00* (2006.01)
*C09K 17/00* (2006.01)

(52) U.S. Cl.
CPC .............. *A01N 63/22* (2020.01); *A01P 21/00* (2021.08); *C09K 17/00* (2013.01)

(58) Field of Classification Search
None
See application file for complete search history.

(56) References Cited

U.S. PATENT DOCUMENTS

| 8,858,933 | B2 | 10/2014 | Alessandri et al. | |
| 9,485,993 | B2 | 11/2016 | Alessandri et al. | |
| 10,945,437 | B2 | 3/2021 | Alessandri et al. | |
| 2013/0195826 | A1 | 8/2013 | Alessandri et al. | |
| 2014/0274691 | A1* | 9/2014 | Thompson | A01N 63/20 504/117 |
| 2015/0050258 | A1 | 2/2015 | Alessandri et al. | |
| 2016/0270391 | A1* | 9/2016 | Lisowsky | A01N 59/16 |
| 2017/0049112 | A1 | 2/2017 | Alessandri et al. | |

FOREIGN PATENT DOCUMENTS

| CN | 103553813 A | * | 2/2014 |
| EP | 0705807 | | 4/1996 |

OTHER PUBLICATIONS

International Search Report for PCT/BR2019/050051 dated Mar. 11, 2019.
Kavamura, V. N, "Bacterias associadas as cactaceas da Caatinga: promocao de crescimento de plantas sob estresse hidrico". Tese (Doutorado)—Escola Superior de Agricultura "Luiz de Queiroz", 2012, pp. 206.
Tordim, C. "Cientistas usam bacterias para ajudar plantas a resistir a seca", May 23, 2017, https://www.embrapa.br/busca-de-noticias/-/noticia/22885691/scientists-use-bacteria-to-help-plants-resist-droughts (Access in Oct. 3, 2019).

* cited by examiner

*Primary Examiner* — Brian J Davis
(74) *Attorney, Agent, or Firm* — B. Aaron Schulman, Esq.; Stites & Harbison, PLLC

(57) ABSTRACT

Multi-functional biological compositions are provided for reducing hydric stress and promoting growth in cultivated plants, for use as an inoculant, as a soil conditioner, as a biostimulant, for phosphorus solubilization and for bioremediation in agricultural areas. In particular, compositions containing mixtures of additives and excipients are provided having at least 2 (two) or more species of *Bacillus* or two or more strains of a single species, or the mutants thereof, concomitantly with additives and excipients, in biological compositions with properties for reducing hydric stress and promoting growth in cultivated plants, for use as an inoculant, as a biological soil conditioner, as a biostimulant, for phosphorus stabilization and for bioremediation in agricultural areas, added to the coating/encrustation used in industrial or non-industrial seed treatment, applied in furrows, using a guided boom or by other application means.

8 Claims, No Drawings

COMPOSITION CONTAINING MICROORGANISMS FOR PROMOTING GROWTH AND REDUCING HYDRIC STRESS IN CULTIVATED PLANTS AND USE THEREOF

The present patent of invention relates to multi-functional biological compositions for reducing hydric stress and promoting growth in cultivated plants, for use as an inoculant, as a soil conditioner, as a biostimulant, for phosphorus solubilization and for bioremediation in agricultural areas; it particularly relates to compositions containing mixtures of additives and excipients having at least 2 (two) or more species of *Bacillus* or 2 (two) or more strains of a single species, or the mutants thereof, concomitantly with additives and excipients, in biological compositions with properties for reducing hydric stress and promoting growth in cultivated plants, for use as an inoculant, as a biological soil conditioner, as a biostimulant, for phosphorus stabilization and for bioremediation in agricultural areas, added to the coating/encrustation used in industrial or non-industrial seed treatment, applied in furrows, using a guided boom or by other application means. Pertaining to the technical sector of biotechnology, these compositions increase the efficiency of conduction in cultivated plants and ploughed land by using mechanisms of action that are different from and complementary to the compositions of the above-mentioned micro-organisms.

STATE OF THE ART

In the present world agricultural scenario, the production gains have been many times associated to gradual productivity increases without an increase in the agricultural area. Said productivity increases have been attained through significant advancements in cultivation techniques, use of varieties more adapted to biotic and abiotic factors, suitability of plant nutritional requirement, and also by better controlling and reducing the damages caused by phytopathogenic agents and plant pests. Among said advancements, the control of pests and diseases is still considered to be the greatest challenge in keeping up with the crop productivity. A number of techniques can be used, with a higher or lower degree of efficacy.

With regard to corn cultivation, the second largest crop in the Brazil, which is the third largest producer in the world (FAOSTAT, 2017), the climatic factor greatly influences its productivity, and the rain regimen is responsible for large oscillations in the production in Brazil (BERGAMASHI & MATZENAUER, 2014). Data from CONAB (2015) show that during the second harvest of the agricultural year of 2014/2015 there was a 14.1% increase in the production compared to the previous year, influenced by the good rain regimen during the development of the crop. However, a quite different situation was observed in the second harvest of the agricultural year of 2015/2016, with a 8.4% decrease in the production, in spite of the increased in the cultivated area, a fact which was due to the dry season during the emergence period and development of the crop (CONAB, 2016).

MAGALHÃES et al. (1996) teach that the hydric need of corn cultivation to complete its cycle is dependent on climatic factors, such as temperature and evapotranspiration, wherein the more severe hydric periods occur during the emergence, flowering and filling of grains (FRATTINI, 1975). Therefore, the impact of the hydric stress on the plant will change according to its phonologic stadium.

Several authors have evaluated the water shortage effect in the crop yield at different intensities and development periods of corn. During the flowering, the hydric stress of two days has affected 20% the crop yield, while the stress during four days has affected over 50% (MAGALHÃES & DURAES, 2006). Similar results have been attained by PANDEY et al. (2000), wherein the seven-day stress during the emergence of the male inflorescence has affected 50% the production, while the same stress occurred in the post-pollination period resulted in losses between 25 and 32%. Losses are also observed when the stress occurs during the vegetative stadium, resulting a 32% reduction in the accumulation of dry matter (QAKIR, 2004). The damages caused by the hydric stress occurred in the initial development stages are irreversible and impact the productivity, and the closer to the flowering higher the production (BALDO, 2007).

A viable alternative with significant results is the use of plant growth promoting rhizobacteria (PGPR). Several mechanisms associated to PGPRs, which help the plants to withstand the effects of the hydric stress have been described, among them: solubilization and fixation of nutrients, production of siderophores, production of plant hormones, production of volatile compounds, change in the morphology and architecture of roots, ACC deaminase activity, accumulation of osmolytes, action on the plant antioxidant system, and production of exopolysacharides (EPS) (ALAMI et al., 2000; ARORA et al., 2001; HUSSAIN et al., 2009; VURUKONDA et al., 2016).

Among the described mechanisms, the production of EPS by bacteria has been widely studied, but aiming at an industrial use, especially in food and drug industries, due to the emulsifying and thickening characteristics thereof (KUMAR et al., 2007). However, given said characteristics, the use of EPS producing bacteria in the agriculture has raised some interest, since they can act as an important tool in the mitigation of abiotic stress.

OBJECTS OF THE INVENTION

Therefore, the object of the present invention is the use of effective compositions that can reduce the hydric stress, promote the growth and as inoculants in cultivated plants, as a soil conditioner, as a biostimulant, for phosphorus solubilization and for biorremediation in agricultural areas, in addition to polymers and/or components used in the treatment, coating or incrustation of seeds (industrial or non-industrial) of cultivated plants, application to plantation furrow, directed bar, even other application routes including, but not limited to, *Coffea* spp (*Coffea arabica, Coffea canefora, Coffea robusta*), *Glycine max, Zea mays, Gossypium hirsutum*, greenery (*Solanum lycopersicum, Allium strain, Lactuca sativa, Daucus carota, Capsicum annuum* Group), forestry (*Eucalyptus* spp., *Tectona grandis, Hevea brasiliensis, Pinus* sp.), *Nicotiana tabacum*, ornamental, fruit (*Citrus* spp., *Malus* spp., *Carica papaya, Vitis* spp., *Cucumis melo, Prunus persica, Passiflora edulis*), *Brachiaria* spp. (*Brachiaria brizantha, Brachiaria decumbens, Brachiaria humidicola, Brachiaria mutica, Brachiaria ruziziensis, Brachiaria arrecta, Brachiaria dictyneura*), *Panicum* spp. (*Panicum maximum*), *Sorghum* spp., *Pennisetum americanum*, crotalarias (*Crotalaria juncea, Crotalaria spectabilis, Crotalaria ochroleuca, Crotalaria paulina, Crotalaria breviflora*), among others. Said compositions envolve the use of 2 (two) or more micro-organisms or 2 (two) or more strains of the same *Bacillus* species including, but not limited to, *Bacillus aryabhattai, Bacillus velezensis,*

*Bacillus agri, Bacillus toyonensis, Bacillus aizawai, Bacillus albolactis, Bacillus firmus, Bacillus coagulans, Bacillus endoparasiticus, Bacillus endorhythmos, Bacillus kustaki, Bacillus lacticola, Bacillus lactimorbus, Bacillus lactis, Bacillus laterosporus, Bacillus lentimorbus, Bacillus megaterium, Bacillus medusa, Bacillus metiens, Bacillus natto, Bacillus nigrificans, Bacillus popilliae, Bacillus pumilus, Bacillus siamensis, Bacillus subtilis, Bacilus lichenformis, Bacillus amyloliquefasciens, Bacillus megaterium, Bacillus sphaericus, Bacillus thuringiensis, Bacillus flexus, Bacillus pseudomycoides, Bacillus natto*, among others.

BRIEF DESCRIPTION OF THE INVENTION

The present invention refers to compositions containing mixtures of at least 2 (two) or more *Bacillus* species or 2 (two) or more strains of the same species, or mutants thereof, concomitantly with additives and excipients, except for US patent 20150050258A1 in use, in biological compositions having properties for reducing hydric stress, promoting the growth, and as inoculants in cultivated plants, for the biological conditioning of soil, as a biostimulant, for solubilizing phosphorus and bioremediation of agricultural areas, added to the coating/incrustation in the treatment of seeds industrial or non-industrially, application to plantation furrow, directed bar or other application routes.

DETAILED DESCRIPTION OF THE INVENTION

The composition containing growth promoting micro-organisms and hydric stress reducers in cultivated plants comprises: 1.0 to 20.0% of at least 2 (two) or more *Bacillus* species or 2 (two) or more strains of the same species, in mixtures and combinations among the whole or part thereof (in colony forming unities, c.f.u.);

1.0 to 20.0% of additives;
1.0 to 97.0% of excipients.

Optionally, essential plant oils and/or extracts of plants and/or vegetables can be added to the composition, as follows:

5.0 to 10.0% of essential oils;
5.0 to 10.0% of plant extracts.

Isolates have been identified and classified by Coleção Brasileira de Microorganismos de Ambiente e Indústria (CBMAI/UNICAMP), where they have been deposited.

The representatives of *Bacillus* genera belong to the group consisting of species: *Bacillus aryabhattai, Bacillus velezensis, Bacillus agri, Bacillus toyonensis, Bacillus aizawai, Bacillus albolactis, Bacillus firmus, Bacillus coagulans, Bacillus endoparasiticus, Bacillus endorhythmos, Bacillus kustaki, Bacillus lacticola, Bacillus lactimorbus, Bacillus lactis, Bacillus laterosporus, Bacillus lentimorbus, Bacillus megaterium, Bacillus medusa, Bacillus metiens, Bacillus natto, Bacillus nigrificans, Bacillus popilliae, Bacillus pumilus, Bacillus siamensis, Bacillus subtilis, Bacilus licheniformis, Bacillus amyloliquefasciens, Bacillus megaterium, Bacillus sphaericus, Bacillus thuringiensis, Bacillus flexus, Bacillus pseudomycoides, Bacillus natto*, among others.

The additives can be, without limitation, dispersants selected from the group consisting water-soluble ionic polymers, amino-acids, alga extracts, naturally occurring compounds, water-soluble anionic polymers, surfactants selected from the group consisting of anionic surfactants and non-anionic surfactants, and combinations thereof.

The excipients can belong, but not limited to, the group consisting of: silicas, talc, bentonite, carbohydrates, carbonates, casein, milk whey and milk products, and combinations thereof.

Plant essential oils or plant extracts are extracted and/or they derive from seeds and/or plants including, but not limited to, *Ricinus communis, Crotalaria juncea, Chenopodium ambrosioides, Aradirachia indica, Verbena officinalis, Erythrina mulungu, Quassia amara, Bidens pilosa, Plantago lanceolata, Senecio brasiliensis, Lantana camara, Tagetes patula, Lantana montevidensis, Eucalyptus* spp., *Lantana montevidensis, Lantana camara, Senecio brasiliensis, Chrysantemum coronarium, Solanum americanum, Solanum paniculatum Hovenia dulcis, Melia azedarach, Butia eriospatha, Schinus terenbithifolius, Cinnamomum camphora, Conyza bonariensis, Senecio brasiliensis, Bidens pilosa, Amaranthus hybridus, Euphorbia heterophylla, Raphanus sativus, Ipomoea purpurea, Brachiaria plantaginea, Ruta graveolens, Aloysia triphylla, Brassica napus, IWUCUna pruriens, Ocimum gratissimum, Lippia sidoides, Croton zehntneri, Mentha piperita, Cymbopogon martinii, Cymbopogon schoenanthus, Piper aduncum, Arisaema franchetianum, Zanthoxylum simulans, Ruta chalepensis, Citrus sinensis, Melaleuca quinquenervia, Cymbopogon citratus, Thymus vulgaris, Piper aduncum, Melaleuca alternifolia, Hesperozygis myrtoides*, among others.

The composition should be used as a wettable powder formulation. However, other formulations containing said micro-organisms, such as encapsulated suspension, dispersible concentrate, emulsifiable concentrate, water-in-oil emulsion, oil-in-water emulsion, microemulsion, concentrated suspension, suspension-emulsion, soluble granulate, soluble concentrate, soluble powder, tablet, dispersible granulate, wettable powder, emulsifiable gel, water-soluble gel, emulsifiable granule, emulsifiable powder, oil dispersion or oil concentrated suspension, mixed formulation of soluble concentrate and concentrated suspension, mixed formulation of soluble concentrate and suspension-emulsion, mixed formulation of soluble concentrate and oil-in-water emulsion, oil dispersible or miscible concentrated suspension, oil miscible solution, oil dispersible powder, encapsulated granulate, dry powder, liquid for electrostatic/electrodynamic spray, granulate, oil for spraying/spreading, ultralow volume suspension, ultralow volume microgranulate, thin powder, thin granulate, macrogranulate, encapsulation, microencapsulation and nanoencapsulation can also be used.

The composition can be used in spraying, plantation furrow spraying, drench, coating (industrial or non-industrial), treatment (industrial or non-industrial) and incrustation (industrial or non-industrial) of seeds of cultivated plants including, but not limited to, *Coffea* spp (*Coffea arabica, Coffea canefora, Coffea robusta*), *Glycine max, Zea mays, Gossypium hirsutum*, greenery (*Solanum lycopersicum, Allium strain, Lactuca sativa, Daucus carota, Capsicum annuum* Group), forestry (*Eucalyptus* spp., *Tectona grandis, Hevea brasiliensis, Pinus* sp.), *Nicotiana tabacum*, ornamental, fruit (*Citrus* spp., *Malus* spp., *Carica papaya*,

*Vitis* spp., *Cucumis melo*, *Prunus persica*, *Passiflora edulis*), *Brachiaria* spp. (*Brachiaria brizantha*, *Brachiaria decumbens*, *Brachiaria humidicola*, *Brachiaria mutica*, *Brachiaria ruziziensis*, *Brachiaria arrecta*, *Brachiaria dictyneura*), *Panicum* spp. (*Panicum maximum*), *Sorghum* spp., *Pennisetum americanum*, crotalarias (*Crotalaria juncea*, *Crotalaria spectabilis*, *Crotalaria ochroleuca*, *Crotalaria paulina*, *Crotalaria breviflora*), among others.

The composition also can be used for the purpose of promoting the growth, reducing hydric stress, as a bioestimulant, as an inoculant, as a phosphorus solubilizer and growth stimulant in cultivated plants including, but not limited to: *Coffea* spp (*Coffea arabica*, *Coffea canefora*, *Coffea robusta*), *Glycine max*, *Zea mays*, *Gossypium hirsutum*, greenery (*Solanum lycopersicum*, *Allium strain*, *Lactuca sativa*, *Daucus carota*, *Capsicum annuum* Group), forestry (*Eucalyptus* spp., *Tectona grandis*, *Hevea brasiliensis*, *Pinus* sp.), *Nicotiana tabacum*, ornamental, fruit (*Citrus* spp., *Malus* spp., *Carica papaya*, *Vitis* spp., *Cucumis melo*, *Prunus persica*, *Passiflora edulis*), *Brachiaria* spp. (*Brachiaria brizantha*, *Brachiaria decumbens*, *Brachiaria humidicola*, *Brachiaria mutica*, *Brachiaria ruziziensis*, *Brachiaria arrecta*, *Brachiaria dictyneura*), *Panicum* spp. (*Panicum maximum*), *Sorghum* spp., *Pennisetum americanum*, crotalarias (*Crotalaria juncea*, *Crotalaria spectabilis*, *Crotalaria ochroleuca*, *Crotalaria paulina*, *Crotalaria breviflora*), among others.

The composition can be used for the purpose of conditioning soil for all crops and any agricultural area, and additionally for the bioremediation of agricultural areas.

EXAMPLES OF REALIZATION

For the sake of example, the composition can show the following concentrations:

Example 1

*Bacillus velezensis:* 1.0 to 20.0%
*Bacillus aryabhattai:* 1.0 to 20.0%
Additives: 1.0 to 20.0%
Excipients: 97.0 to 40.0%

Example 2

*Bacillus aryabhattai:* 1.0 to 20.0%
*Bacillus licheniformis:* 1.0 to 15.0%
*Bacillus amyloliquefaciens:* 1.0 to 15.0%
Essential oil of *Melaleuca alternifolia:* 5.0 to 20.0%
Additives: 1.0 to 20.0%
Excipients: 91.0 to 10.0%

Example 3

*Bacillus aryabhattai:* 1.0 to 20.0%
*Bacillus licheniformis:* 1.0 to 15.0%
*Bacillus velezensis:* 1.0 to 20.0%
Essential oil of *Aradirachia indica:* 5.0 to 20.0%
*Piper aduncum* extract: 5.0 to 15.0%
Additives: 1.0 to 10.0%
Excipients: 86.0 to 10.0%

Example 4

*Bacillus aryabhattai* (strain 01): 1.0 to 20.0%
*Bacillus aryabhattai* (strain 04): 1.0 to 20.0%
Additives: 1.0 to 20.0%
Excipients: 97.0 to 40.0%

Example 5

*Bacillus thuringiensis:* 1.0 to 20.0%
*Bacillus aryabhattai:* 1.0 to 20.0%
Additives: 1.0 to 20.0%
Excipients: 97.0 to 40.0%

Example of Application

Compositions containing different proportions and combinations of *Bacillus* genus micro-organisms, amino-acids and excipients thereof were prepared for treating seeds for the purpose of evaluating their efficiency in the reduction of abiotic stress. The example below illustrates, without limitation, the use of this composition:

EXAMPLE: Use of a biological composition in the treatment of corn seeds (*Zea mays* L.) aiming at mitigating the damages caused by hydric stress.

OBJECT: To evaluate, under green-house conditions, the effect of the treatment of seeds in corn plantation using formulations containing rhizobacteria and evaluate the effects on the reduction of hydric stress.

MATERIAL AND METHODS: The selection of isolates with a larger potential to promote growth in corn plants, under hydric stress conditions, was carried out from the collection of micro-organisms belonging to company Agrivalle Brasil Ind. e Com. de Produtos Agricolas Ltda., in a green-house with a fully casualized statistical outline (CSO).

The seeds used therein were purged with a 2% sodium hypochloride solution, 70%, alcohol, and then washed with distilled water, sterilized and dried at room temperature for 10 minutes. The seed treatment corresponded to the application of 0.3 mL of a formulation containing *Bacillus* in 1 Kg or previously weighed seeds. The seeds were planted in pots containing 1.5 kg of soil, and watered until 80% of the field capacity (F.C.) was reached. Every treatment was comprised of 5 repetitions randomly disposed containing two plants per pot. Hydric stress was induced as soon as the first fully developed leaf was noticed in the plants. The treatments were carried out under two irrigation regimens: hydric stress and irrigated. Hydric stress was characterized by keeping the pots at 30% F.C., and the irrigation treatment was kept at 80% F.C. The experiment was conducted until 45 days after the seeds were sown. Then, the root length, fresh and dry matter mass of the aerial part and root were evaluated. The final data were then subjected to variance analysis and the averages were compared through Tukey test at 5%. The data were transformed using —.Jx function whenever necessary, and then subjected to statistical analysis.

Results and Discussion

Significant statistical differences have been observed in all evaluations [fresh root mass (FRM), dry root mass (DRM), fresh aerial part mass (FAPM), dry aerial part mass (DAPM), and plant height (PH)], wherein treatments T3, T6 and T8 showed values significantly higher than treatment T2 (non-irrigated control) for DRM parameter, thus demonstrating that said micro-organisms have a higher root production capacity under hydric stress conditions.

TABLE 2

Evaluation of plant height (PH), fresh aerial part mass (FAPM), fresh root mass (FRM), and dry aerial part mass (DAPM) and dry root mass (DRM) of corn 45 days after sowing. (IDENTIFY THE ORGANISMS).

| Treatment | Height (cm) | FAPM (g) | FRM (g) | DAPM (g) | DRM (g) |
|---|---|---|---|---|---|
| T1 (CI) | 59.38 a | 23.38 a | 21.90 a | 1.68 a | 1.70 a |
| T2 (CNI) | 35.91 b | 6.3 bcde | 9.41 bc | 0.31 c | 0.60 cd |
| T3 (*Bacillus aryabhattai* strain 1) | 41.56 b | 0.26 b | 12.59 b | 0.47 bc | 0.91 b |
| T4 (*Bacillus aryabhattai* strain 2) | 37.00 b | 5.46 cde | 9.52 bc | 0.36 c | 0.69 bcd |
| T5 (*Bacillus thuringiengis*) | 33.13 bc | 4.81 de | 7.18 cd | 0.48 bc | 0.64 cd |
| T6 (*Bacillus aryabhattai* strain 4) | 40.88 b | 7.91 bcd | 12.39 b | 0.67 b | 0.96 b |
| T7 (*Bacillus aryabhattai* strain 1) + *Bacillus aryabhattai* strain 4) | 28.50 c | 4.06 e | 6.80 d | 0.38 c | 0.58 d |
| T8 (*Bacillus aryabhattai* strain 1) + *Bacillus aryabhattai* strain 2) | 41.31 b | 8.18 bc | 12.40 b | 0.73 b | 0.94 b |
| T9 (*Bacillus aryabhattai* strain 1) + *Bacillus thuringiengis*) | 36.25 b | 7.11 bcd | 9.97 bc | 0.64 b | 0.77 bcd |
| T10 (*Bacillus aryabhattai* strain 4) + *Bacillus thuringiensis*) | 37.94 b | 7.58 bcd | 11.47 b | 0.73 b | 0.83 bc |
| T11 (*Bacillus aryabhattai* strain 4) + *Bacillus aryabhattai* strain 2) | 35.00 b | 5.28 cde | 9.74 bc | 0.54 bc | 0.75 cd |
| T12 (*Bacillus aryabhattai* strain 2) + *Bacillus thuringiensis*) | 33.56 bc | 4.89 de | 10.65 b | 0.45 bc | 0.83 bc |
| CV (%) | 7.22 | 15.33 | 10.31 | 15.48 | 10.02 |

Averages followed by the same letter in the column do not differ from one another according to Tukey test (5%). FAPM: Fresh aerial part mass; FRM: Fresh root mass; DAPM: Dry aerial part mass; DRM: Dry root mass; IC: Irrigated control; NIC: Non-irrigated control.

As to the other parameters which were evaluated—PH, FAPM and FRM—no significant difference between the averages of the treatments and the non-irrigated control were observed. However, it should be noticed that treatments T3, T6, T8 and T10, even when it was not significant compared to the non-irrigated control treatment, showed higher numerical values in all previously mentioned parameters, thus suggesting that said micro-organisms tend to aggregate competitive advantages to the crop and in the mitigation of damages caused by hydric stress to corn plantation.

Based on the results attained, it can be demonstrated that the treatment of seeds with formulations containing *Bacillus* genus rhizobacteria in corn plants under hydric stress minimizes the negative effects of water shortage.

CONCLUSIONS

The use of formulations containing *Bacillus* genus rhizobacteria, combined with the treatment of seeds, is a viable alternative for reducing the negative effect caused by hydric stress in cultivable plants. Further, besides the diversity of mechanisms of action of specific said micro-organisms, this biological formulation extends the benefic effects of the technique, and then it can be expanded to other crops and different cultivation regions.

The composition for reducing the damages caused by hydric stress shall follow the flow of events below:

Raw material: the raw material that will make out the product shall be received and handled by trained people;

Mixture: the raw material shall be weighed and mixed following the standard operational procedure (SOP) at the proportions indicated therein;

Sampling: after the mixing, samples shall be taken for the examination and product guarantee certification. The number of colony forming unities (c.fu.)/g product shall be evaluated;

Packing: the formulated product within the guarantee specifications shall be packed in previously labeled 1.0, 5.0 and 10.0 kg plastic vials. The vials/pouches are sealed and closed;

Storage: the vials/pouches are accommodated on pallets and stored in a dry aired light-protected place, and kept under said condition until being dispatched.

The present invention may be applied either by plantation furrow spraying, bar spraying, as a treatment (industrial or non-industrial), and incrustation (industrial or non-industrial) of seeds. The application method shall be analyzed case by case and will depend on the technical conditions and needs of every producer.

Advantages Attained

The use of rhizobacteria genus in addition to, or not, essential oils and plant extracts, polymers and/or components of coating/incrustation of cultivable plant seeds thus obtained offers the following advantages:

- It is easy to operate when used as a technology in the industrial or non-industrial treatment of seeds;
- It is a viable alternative for reducing the damages caused by abiotic stress, mainly the stress cause by water shortage in the cultivable plant system;
- It provides advantages in the colonization and replacement of micro-organisms for the soil microbiota;
- It promotes an accelerated growth in cultivable plants, thus aggregating a larger photosynthetic mass active for production;
- It can be used in constituents or the coating/incrustation of seeds including, but not limited to, *Coffea* spp (*Coffea arabica, Coffea canefora, Coffea robusta*), *Glycine max, Zea mays, Gossypium hirsutum*, greenery (*Solanum lycopersicum, Allium strain, Lactuca sativa, Daucus carota, Capsicum annuum* Group), forestry (*Eucalyptus* spp., *Tectona grandis, Hevea brasiliensis, Pinus* sp.), *Nicotiana tabacum*, ornamental, fruit (*Citrus* spp., *Malus* spp., *Carica papaya, Vitis* spp., *Cucumis melo, Prunus persica, Passiflora edulis*), *Brachiaria* spp. (*Brachiaria brizantha, Brachiaria decumbens, Brachiaria humidicola, Brachiaria mutica, Brachiaria ruziziensis, Brachiaria arrecta, Brachiaria dictyneura*), *Panicum* spp. (*Panicum maximum*), *Sorghum* spp., *Pennisetum amertcanum*, crotalarias (*Crotalaria juncea, Crotalaria spectabilis, Crotalaria ochroleuca, Crotalaria paulina, Crotalaria breviflora*), among others, in industrial or non-industrial treatment.
- It can be applied to a full area by bar spraying, or even a jet directed to the plantation furrow in crops including, but not limited to, *Coffea* spp (*Coffea arabica, Coffea canefora, Coffea robusta*), *Glycine max, Zea mays, Gossypium hirsutum*, greenery (*Solanum lycopersicum, Allium strain, Lactuca sativa, Daucus carota, Capsicum annuum* Group), forestry (*Eucalyptus* spp., *Tectona grandis, Hevea brasiliensis, Pinus* sp.), *Nicotiana tabacum*, ornamental, fruit (*Citrus* spp., *Malus* spp., *Carica papaya, Vitis* spp., *Cucumis melo, Prunus persica, Passiflora edulis*), *Brachiaria* spp. (*Brachiaria brizantha. Brachiaria decumbens, Brachiaria humidicola, Brachiaria mutica, Brachiaria ruziziensis, Brachiaria arrecta, Brachiaria dictyneura*), *Panicum* spp. (*Panicum maximum*), *Sorghum* spp., *Pennisetum americanum*, crotalarias (*Crotalaria juncea, Crotalaria spectabilis, Crotalaria ochroleuca, Crotalaria paulina, Crotalaria breviflora*), among others.

The scope of the present invention shall not be limited to the application examples, but to the terms defined in the claims and equivalents thereof.

BIBLIOGRAPHIC REFERENCES

ALAMI, Yoones el at. Rhizosphere soil aggregation and plant growth promotion of sunflowers by an exopolysaccharide-producing *Rhizobium* sp. Strain isolated from sunflower roots. Applied and environmental microbiology, v. 66, n. 8, p. 3393-3398. 2000.

ARORA, N. K.: KANG, S. C, MAHESHWARI. D. K. Isolation of siderophore producing strains of *Rhizobium meliloti* and their biocontrol potential against *Macrophomina phaseolina* that causes charcoal rot of groundnut. Curr. Sci, v. 81. n. 6. p. 673-677, 2001.

BALDO. Marcelo Nascimento. Comportamento anatômico, fisiolôgico e agronômico do milho (*Zea mays* L.) submetido a estresses de ambiente em diferentes estádios fenológicos. 2007. Tese de Doutorado. Escola Superior de Agricultura "Luiz de Queiroz.

BERGAMASCHI. Homero; MATZENAUER. Ronaldo. O milho e o clima. Porto Alegre: Emater/RS-Ascar, p. 84, 2014.

çAKIR. Recep. Effect of water stress at different development stages on vegetative and reproductive growth of corn. Field Crops Research, v. 89, n. 1, p. 1-16.2004.

CONAB. Acompanhamento da Safra Brasileira De Grãos. Safra 2014/15-Sexto Levantamento. Brasilia, v. 2, n. 11, p. 1-103, agosto. 2015.

CONAB. Acompanhamento da Safra Brasileira De Grãos. Safra 2015/16-Nono levantamento. Brasília, v. 3, n. 9, p. 1-174, junho 2016.

FAOSTAT Website Disponível em: Accessed May 7, 2017.

FRATTINI. J. A. Cultura do milho: instruções sumárias. Campinas:

CATI/COT. P, v. 26, 1975.

HUSSAIN. M. B. et al. Potential of *Rhizobium* spp. for improving growth and yield of rice (*Oryza sativa* L.). Soil Environ, v. 28, n. 1, p. 49-55, 2009.

KAVAMURA, Vanessa Nessner et al. Screening of Brazilian cacti rhizobacterin for plant growth promotion under drought. Microbiological research. v. 168, n. 4, p. 183-191.2013.

KUMAR, Sudhir; STECHER, Glen: TAMURA, Koichiro. MEGA7: Molecular Evolutionary Genetics Analysis version 7.0 for bigger datasets. Molecular biology and evolution. p. msw054, 2016.

NASEEM. Hafsa: BANO, Asghari. Role of plant growth-promoting rhizobacteria and their exopolysaccharide in drought tolerance or maize. Journal of Plant Interactions, v. 9, n. 1, p. 689-701, 2014.

MAGALHÃES, Paulo César: DURÃES, Frederico O M: GOMIDE, Reinaldo Lúcio. Fisiologia da cultura do milho. Empresa Capixaba de Pesquisa Agropecuária. Manual técnico para a cultura do milho no estado do Espírito Santo. Vitória: EMCAPA, p. 15-33, 1996.

PANDEY. R. K.: MARANVILLE, J. W.; ADMOU, A. Deficit irrigation and nitrogen effects on maize in a Sahelian environment: I. Grain yield and yield components. Agricultural water management. v. 46, n. 1, p. 1-13, 2000.

Stkora R A, Padghmu J L. 2007. Biological control potential and modes of action of *Bacillus megaterium* against *Meloidogyne graminicola* on rice. Crop Protection 26:971-977.

VURUKONDA, Sai Shiva Krishna Prasad et al. Enhancement of drought stress tolerance in crops by plant growth promoting rhizobacteria. Microbiological research. v. 184, p. 13-24, 2016.

The invention claimed is:

1. A composition consisting of:
   (a) 1.0 to 20.0% of at least two *Bacillus* species or strains of the same species in c.f.u., wherein the two *Bacillus* species or strains are selected from the group consisting of a combination comprising *Bacillus aryabhattai* strain 1 and *Bacillus aryabhattai* strain 2 and a combination comprising *Bacillus aryabhattai* strain 4 and *Bacillus thuringiensis;*
   (b) 1.0 to 20.0% of an additive: selected from the group consisting of water-soluble ionic polymers, amino-acids, alga extracts, naturally occurring compounds, water-soluble anionic polymers, anionic surfactants, non-anionic surfactants, and combinations thereof;

(c) 1.0 to 97.0% of an excipient selected from the group consisting of: silicas, talc, bentonite, carbohydrates, carbonates, casein, milk whey and milk products, and combinations thereof; and (d) 5.0 to 10.0% of an essential oil or 5.0 to 10.0% of a plant extract wherein the essential oil or plant extract is selected from the group consisting of a *Melaleuca alternifolia* extract, an *Aradirachia indica* extract, and a *Piper aduncum* extract.

2. The composition of claim 1, formulated as a wettable powder, encapsulated suspension, dispersible concentrate, emulsifiable concentrate, water-in-oil emulsion, oil-in-water emulsion, microemulsion, concentrated suspension, suspension-emulsion, soluble granulate, soluble concentrate, soluble powder, tablet, dispersible granulate, wettable powder, emulsifiable gel, water-soluble gel, emulsifiable granule, emulsifiable powder, oil dispersion or oil concentrated suspension, mixed formulation of soluble concentrate and concentrated suspension, mixed formulation of soluble concentrate and suspension-emulsion, mixed formulation of soluble concentrate and oil-in-water emulsion, oil dispersible or miscible concentrated suspension, oil miscible solution, oil dispersible powder, encapsulated granulate, dry powder, liquid for electrostatic/electrodynamic spray, granulate, oil for spraying/spreading, ultralow volume suspension, ultralow volume microgranulate, thin powder, thin granulate, macrogranulate, encapsulation, microencapsulation and nanoencapsulation.

3. A method for spraying, furrow spraying, and drenching of cultivated plants comprising administering the composition according to claim 1 for spraying, furrow spraying, and drenching of cultivated plants.

4. A method for coating, treating and encrusting of industrial or non-industrial seeds comprising administering the composition according to claim 1 for coating, treating and encrusting of industrial or non-industrial seeds.

5. A method for enhancing the growth of cultivated plants comprising administrating the composition of claim 1 as a biostimulant, as an inoculant, as a phosphorus solubilizer, or as a growth stimulant for enhancing the growth of cultivated plants.

6. A method for reducing hydric stress in cultivated plants comprising administering the composition according to claim 1 for reducing hydric stress in cultivated plants.

7. A method for conditioning a soil for the growth of cultivated plants comprising administering the composition according to claim 1 for conditioning a soil for the growth of cultivated plants.

8. A method for bioremediating cultivable areas comprising administering the composition according to claim 1 for bioremediating cultivable areas.

* * * * *